No. 823,866. PATENTED JUNE 19, 1906.
W. F. HOGAN.
OIL BURNER.
APPLICATION FILED SEPT. 29, 1905.

Witnesses:
Arthur L. Slee
J. A. Amsee

Inventor:
William F. Hogan
By Geo. H. Strong, atty.

UNITED STATES PATENT OFFICE.

WILLIAM F. HOGAN, OF SAN FRANCISCO, CALIFORNIA.

OIL-BURNER.

No. 823,866.                  Specification of Letters Patent.                  Patented June 19, 1906.

Application filed September 29, 1905. Serial No. 280,608.

*To all whom it may concern:*

Be it known that I, WILLIAM F. HOGAN, a citizen of the United States, residing in the city and county of San Francisco and State of California, have invented new and useful Improvements in Oil-Burners, of which the following is a specification.

My invention relates to improvements in burners for hydrocarbon oils.

It consists in the combination of mechanism and in details of construction, which will be more fully explained by reference to the accompanying drawings, in which—

Figure 1:
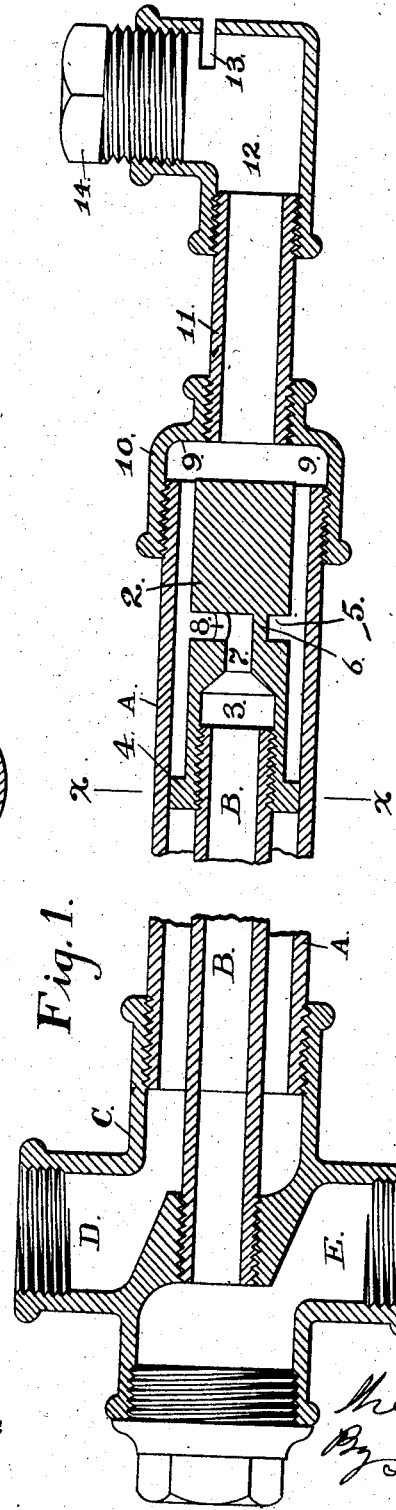
Figure 2:
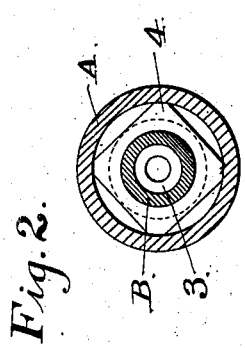
Figure 3:
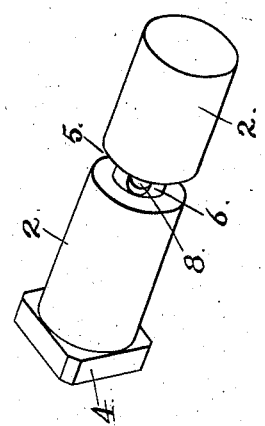

Figure 1 is a longitudinal vertical section of the apparatus. Fig. 2 is a transverse section taken through X X of Fig. 1. Fig. 3 is a perspective view of the mixer.

In an apparatus for burning crude mineral oil it is customary to inject steam or air mixed with the oil and by various devices subdivide and atomize the oil to the highest degree possible. In such devices it has been common to make small perforations through which the oil passes, and these perforations are liable to become clogged by very small particles of foreign matter, so that the burner must be taken apart and cleaned.

It is the object of my invention to provide an atomizer and mixer of such character that no clogging of the passages will take place.

As shown in the drawings, A is an outer steam-tube, and B is an inner oil-tube. These tubes are connected by a suitably-constructed coupling, as at C, having separate chambers, into one of which, D, steam is admitted under pressure, and into the other one, E, oil is admitted, and from these chambers the steam and oil are respectively transmitted through the pipes A and B.

2 is a plug of metal, the body of which is cylindrical, and the end into which the pipe B is screwed has a chamber 3 of sufficient diameter and screw-threaded to receive the correspondingly-threaded end of the pipe B. The diameter of the cylindrical portion of the plug 2 is sufficiently less than the interior diameter of the pipe A so that there will be an annular channel formed between the two. The head 4 of the part 2 is made rectangular, as shown, the angles of the rectangle being slightly cut away and fitting snugly in the pipe A. The surfaces of this head between the angles thus form chords to subtend the arcs of the interior of the tube A, thus providing segmental passages through which steam from the annular channel between the pipes A and B may pass into the annular channel surrounding the part 2. This part 2 has an annular groove turned around it, as shown at 5, the groove being about three-sixteenths of an inch in width. From the chamber 3, into which the pipe B is screwed, a three-sixteenths-inch hole 7 is bored into the reduced shank 6, which is formed by turning the groove 5, and a three-sixteenths-inch hole 8 is made radially through one side of the reduced shank 6 and connecting with the hole 7. Thus an opening of sufficient diameter to prevent clogging is made for the delivery of the oil from the pipe B into the annular chamber between the plug 2 and the interior of the pipe A.

Where the oil and the steam meet the jets of steam traveling parallel with the axes of the parts impel the oil directly against the shoulder 9, which is formed in a coupling 10, into which the pipe A is screwed. The coupling is reduced so as to receive a three-eighths-inch pipe 11, to which the end of the burner-tube 12 is screwed. The shoulder 9 is thus formed by the reduction of the coupling 10, and the oil being forcibly driven against this shoulder by the jet of steam is finely atomized before passing out through the connecting-tube 11 into the burner-head 12.

The burner-head 12 is here shown in the form of an elbow having an upwardly-turned portion, and in the front of this upwardly-turned portion is made a horizontal segmental slot 13, through which the combustible vapor is discharged. The upper end of the upturned portion of the burner-head 12 is closed by a screw-plug, as at 14, thus providing an easy access to the interior, if required. I have found that by the use of the plug 2, with the groove and the open passage 7 and 8, through which the oil passes, there will never be any difficulty caused by clogging within the mixing-chamber, and this is especially valuable where such burners are used upon steamships on long voyages.

Having thus described my invention, what I claim, and desire to secure by Letters Patent, is—

An improved oil-burner having in combination, concentric pipes for the passage of oil and steam, a cylindrical plug fixed to the end of the inner tube and having a smaller diameter than the outer tube, said plug having a head rectangular in cross-section and the angles of which fit the outer tube at separated points, the straight outer sides of the head between the said angles forming segmental passages for the steam, said plug having a chamber at one end connecting with the oil-pipe, and having an annular groove at an intermediate point with a radial hole therethrough leading the oil into the chamber between the plug and outer tube, a coupling on the end of the outer tube having an internal shoulder projected across the path of the steam and oil delivered through said annular chamber, and a burner-head and means connecting it to said coupling.

In testimony whereof I have hereunto set my hand in presence of two subscribing witnesses.

WILLIAM F. HOGAN

Witnesses.
R. S. BROWNE,
N. BRODDUS.